United States Patent [19]
DeLaMatyr et al.

[11] Patent Number: 5,760,976
[45] Date of Patent: Jun. 2, 1998

[54] KINEMATIC INTEGRATING OPTIC MOUNT

[75] Inventors: Richard Daniel DeLaMatyr, Heath; Edwin L. Brown, Allen, both of Tex.

[73] Assignee: Texas Instruments Incorporated, Dallas, Tex.

[21] Appl. No.: 842,628

[22] Filed: Apr. 15, 1997

[51] Int. Cl.[6] ............................................... G02B 7/02
[52] U.S. Cl. ..................... 359/820; 359/818; 359/808; 359/813; 359/288
[58] Field of Search ............................ 359/820, 808, 359/811, 813, 819, 823, 818, 288

[56] References Cited

U.S. PATENT DOCUMENTS

| | | | |
|---|---|---|---|
| 4,019,159 | 4/1977 | Hon et al. | 359/288 |
| 4,148,550 | 4/1979 | MacAnally | 359/808 |
| 4,148,551 | 4/1979 | MacAnally | 359/808 |
| 4,848,881 | 7/1989 | Kahan et al. | 359/288 |
| 5,249,082 | 9/1993 | Newman | 358/813 |

*Primary Examiner*—Loha Ben
*Attorney, Agent, or Firm*—Charles A. Brill; James C. Kesterson; Richard L. Donaldson

[57] ABSTRACT

An elongated optic (12) is supported within a cylindrical housing (18) by a pair of support rods (14) passing through the cylindrical housing (18). A resilient retention spring (16) diametrically opposed to each support rod (14) presses the elongated optic (12) against the support rod (14) to prevent movement by the elongated optic (12) while allowing the elongated optic (12) to expand and contract. Contact between the support rods (14) and the resilient retention spring (16) is minimized to prevent inhibiting the internal reflectivity of the elongated optic.

24 Claims, 2 Drawing Sheets

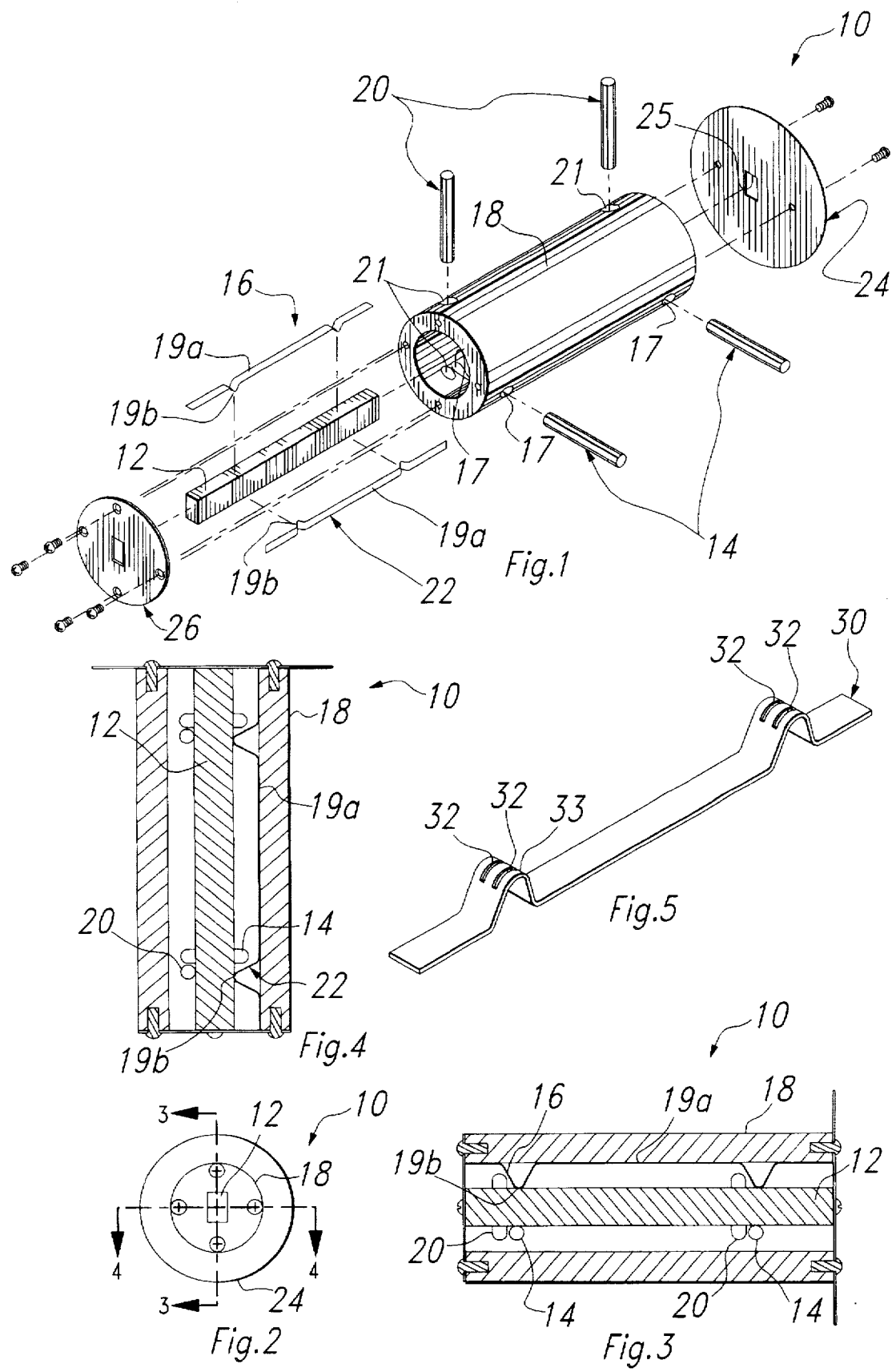

KINEMATIC INTEGRATING OPTIC MOUNT

FIELD OF THE INVENTION

This invention pertains to mounting optical components, more particularly to mounting optical components for use in a wide range of thermal and dynamic environments, and most particularly to mounting display system optical components for use in a wide range of thermal and dynamic environments while minimizing contact with the optical components in order to maximize the ability of the components to totally internally reflect light passing therethrough.

BACKGROUND OF THE INVENTION

Spatial light modulators (SLMs), such as the Digital Micromirror Device (DMD), are comprised of an array of independently operable modulator elements. Each modulator element in the array is independently operable selectively to modulate light striking the element according to electronic image data received by the SLM.

Typically, the electronic image data represents a brightness value for each of a number of individual picture elements, or pixels, which comprise a desired image. Each modulator element in the array corresponds to one of the pixels. Each modulator element in the SLM receives a brightness value for one pixel and modulates part of a beam of light directed on the SLM. The elements in the SLM array together modulate the entire beam of light directed on the SLM.

Each element in the SLM array modulates part of the beam of light by directing a portion of the light toward an image plane to form an image. The portion of the beam of light that is not directed to an image plan is absorbed or directed away from the image plane. The portion of the light striking each modulator element that is directed toward the image plane is representative of the image data brightness value received by the modulator element.

The image data brightness values received by the SLM array typically determine what portion of the light striking each element is directed toward the image plane. Most SLMs are not able to detect, much less compensate for, the amount of light striking each individual modulator element. Therefore, if different quantities of light strike elements that receive the same brightness value, the elements will direct different amounts of light toward the image plane and the pixels created by the elements will have different intensities. Thus, if the light beam incident the SLM is not homogeneous, that is it does not have the same flux density throughout the light beam, the image formed by the SLM will be distorted.

Unfortunately, most light sources produce beams of light that are far from homogeneous. The lack of uniformity requires the use of an integrating optic to mix the portions of the beam of light in order to create a uniform beam. The integrating optic could be as simple as a piece of ground glass, which randomly diffracts the beam of light. A ground glass integrator, however, reduces the maximum brightness of the display system since the ground glass scatters light in all directions. The light that is scattered away from the projection optics is lost, thereby reducing the efficiency of the display system and perhaps causing harmful interference with the image path.

One example of an efficient integrating optic is a polished glass rod. The polished surfaces of the glass rod internally reflect light striking them at a shallow angle due to a phenomena called total internal reflection. Total internal reflection occurs when light traveling in a first medium, here the glass rod, strikes an interface between the first medium and a second medium, typically air, at an angle greater than the inverse sine of the ratio of the index of refraction of the second medium to the index of refraction of the first medium. Because the light is reflected from the surfaces of the glass integrating rod, the glass rod acts like a conduit to channel and integrate light entering one end of the glass rod and exiting the other end. As the beam of light is reflected within the glass rod, intensity non-uniformities inherent in the light source are mixed throughout the exiting beam of light, resulting in a homogenous beam of light exiting the glass integrating rod.

SUMMARY OF THE INVENTION

According to one embodiment of the present invention, an apparatus for mounting an elongated optical member so that the member is minimally contacted and is permitted to thermally expand and contract without damage thereto is provided. The apparatus comprises an elongated housing having a chamber therethrough for receiving the optical member therewithin and having a major axial dimension substantially equal to the length of the optical member, a first support rod mounted by the housing within the chamber for contacting and supporting the optical member along a first line which is generally perpendicular to the major axis of the chamber, a first resilient member acting between the chamber and the optical member along a second line which is diametrically opposed to and parallel to the first line, the support rod and the resilient member permitting the optical member to expand and contract in a direction which is parallel to the major axis of the chamber, the resilient member permitting the optical member to expand and contract perpendicularly to the major axis of the chamber.

According to another embodiment of the present invention, an apparatus for mounting an elongated optical member so that the member is minimally contacted and is permitted to thermally expand and contract without damage thereto is provided. The apparatus comprises an elongated housing having a chamber therethrough for receiving the optical member therewithin and having a major axial dimension substantially equal to the length of the optical member, a first support member mounted by the housing and within the chamber for contacting and supporting the optical member through a first region which is generally perpendicular to the major axis of the chamber, and a first resilient member acting between the chamber and the optical member through a second region which is diametrically opposed to the first region, the support member and the resilient member permitting the optical member to expand and contract in a direction which is parallel to the major axis of the chamber, the resilient member permitting the optical member to expand and contract perpendicularly to the major axis of the chamber.

According to yet another embodiment of the present invention, a method of retaining an elongated optical component is provided. The method comprising the steps of providing a first member for supporting said elongated optical component, elastically biasing said elongated optical component against said first member, providing a second member to restrain movement of said optical component across said first member, elastically biasing said elongated optical component against said second member.

BRIEF DESCRIPTION OF THE DRAWINGS

FIG. 1 is an exploded view of a first embodiment of an optic mount specifically optimized for holding a glass rod integrating optic.

FIG. 2 is an end view of the optic mount of FIG. 1.

FIG. 3 is a top cross-section view of the optic mount of FIG. 1, sectioned along line 3—3 of FIG. 2.

FIG. 4 is a side cross-section view of the optic mount of FIG. 1, sectioned along line 4—4 of FIG. 2.

FIG. 5 is a perspective view of an alternate embodiment of the retention spring of FIG. 1.

DETAILED DESCRIPTION OF THE DRAWINGS

Figure 6:
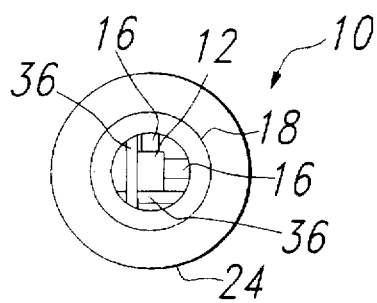
FIG. 6 is an end view of an optic mount similar to the optic mount of FIG. 1 with the output aperture removed to show the location of the retention springs and support rods.

A polished glass rod is an effective integrating optic for a display system, and is inexpensive to fabricate. An inexpensive, effective mount for holding the glass integrating rod within the display system, however, is not readily available. The glass rod integrating optic is mounted very close to the light source in the display system. Because of its proximity to the light source, and because of the high levels of light transmitted through the glass integrating rod, the glass integrating rod is exposed to very high operating temperatures. The high operating temperature causes the mount and the glass integrating rod to expand. Expansion of the rod can shatter it when it is constrained by conventional optic mounts. Therefore, there is a need for a optic mount that allows the mount and the integrating optic to expand and contract without inducing stress thereon.

Although the optic mount must allow for expansion and contraction of the integrating optic, the mount must be rigid enough to prevent misalignment or loss of the integrating optic during the shocks typically experienced by portable electronic equipment. Furthermore, because the glass rod integrating optic relies on internal reflection to ensure efficient operation, and because permitting the glass integrating rod to be contacted with media other than air may defeat the internal reflection, contact between the mount and the glass integrating rod must be minimized. Existing optic mounts either do not meet these requirements for use of the rod in a portable display system, or they are too expensive for that application.

According to a first embodiment of an optic mount 10, shown in FIG. 1, a glass integrating rod 12 is supported by two opposing pairs of support facilities 14, 16 and 20, 22 at each end of the glass integrating rod 12. According to one embodiment of the present invention, shown in FIG. 1, the support members 14, 16, 20, and 22 comprise support rods 14, 20 and retention springs 16, 22 which press the glass integrating rod 12 against the cylindrical support rods 14 and 20.

As shown in FIG. 1, the integrating glass rod 12 rests on two support rods 14. A retention spring 16 presses the glass integrating rod 12 firmly against the two support rods 14 by applying pressure to the glass integrating rod 12 at points diametrically opposite the location of the support rods 14. Pairs of aligned passageways 17 through the walls of hollow, cylindrical enclosure 18 hold the support rods 14 against the glass integrating rod 12. The retention spring 16 comprises a resilient strip 19a formed with two protrusions 19b. As shown in FIG. 3, the spring 16 is inserted into the enclosure 18 so that the strip 19a rests against the inner wall of the enclosure 18 and the protrusions 19b engage the rod 12 diametrically opposite the rods 14.

Typically, the support rods 14, 20 are fused silica, although other materials such as UBK7 Schott glass may also be used. The retention springs are typically spring steel, such as 303 steel, but other materials such as a beryllium-copper alloy may be used. The enclosure 18 is typically aluminum. The materials must be selected not only to have the necessary rigidity and resilience, but also to withstand the high temperatures to which the optic mount 10 and integrating rod 12 are exposed. Under normal operating conditions the temperatures may reach 200° C.

Retention spring 16 and the two support rods 14 combine to firmly hold the glass integrating rod 12 in position along a first axis between the retention spring 16 and the support rods 14. Furthermore, the retention spring 16 and the support rods 14 hold the glass integrating rod in position while minimizing the area of contact with the glass rod 12. Contact with the glass integrating rod 12 defeats the rod's ability to totally internally reflect light passing through the glass integrating rod 12 and lowers the efficiency of the display system.

A second pair of support rods 20 and passageways 21, similar to the rods 14 and the passageways 17, and a second retention spring 22, similar to the spring 16 restrain the glass integrating rod 12 along a second axis which is normal to the first axis. An input aperture plate 24 and an output aperture plate 26 assist in restraining the glass integrating rod 12 along a third axis normal to the first and second axes. Restraint is provided by the spring force of the retention spring against the glass rod in conjunction with the coefficient of friction between glass and steel. The input and output aperture plates 24, 26 are sufficiently flexible to permit and accommodate longitudinal thermal expansion of the integrating glass rod 12.

Typically, the input aperture plate 24, is reflective so that light from the light source that does not pass through an aperture 25 is reflected back toward the light source. The use of a reflective input aperture plate 24 minimizes stray light striking the mount and rod which reduces the temperature of the optic mount 10 from 200° C. to only 90° C., thereby allowing a much broader selection of materials to be used in the optic mount 10. Additionally, if the illumination system uses a parabolic or elliptical reflector, it causes an over fill of the input aperture 25 of the integrating device. This also increases the temperature of the mount and rod. By using a reflective aperture, the heat from the over fill light is reduced by up to 60%, and light from the reflector is returned to the lamp reflector and given another opportunity to strike the input aperture. Experiments have shown that this can increase the usable light received at the aperture by 10%. Finally, while the reflector plate 24 shown here is flat, it could be mounted at an angle and/or have curvature for increasing the optical throughput of the system. The curvature increases the probability of the light reflected back to the source striking the input of the integrating optic.

Output aperture plate 26, in addition to restraining the rod in concert with aperture plate 24 also contributes to efficient operation of the illumination system, when this integrating optic is used with a spatial light modulator array. Spatial light modulator arrays are typically square or rectangular. The output aperture plate 26 could have its aperture shaped to frame the light to the appropriate size and shape. This tailoring of the light to the modulator will reduce light wasted in the system and will also prevent any artifacts in the final image from scattered light reflected off of inactive parts of the modulator.

Another embodiment of the optic mount 10 could use opposing pairs of springs 16, 22 instead of a support rod 14, 20 opposed by a spring 16, 22. The use of a rigid rod, however, in combination with a single spring, allows for the elongated integrating optic to be precisely located within the housing.

FIG. 2 is an end view of the optic mount of FIG. 1 from the output aperture plate 26 end. FIG. 3 is a sectioned view of the optic mount of FIG. 2 taken along line A—A in FIG. 2. FIG. 4 is a sectioned view of the optic mount of FIG. 2 taken along line B—B in FIG. 2. FIGS. 3 and 4 show the interrelationship of the retention springs 16 and 22, and the support rods 14, and 20.

The cylindrical surfaces of the support rods 14 and 20 and the configuration of retention springs 16 and 22 at the protrusions 19b which contact the glass integrating rod 12 both act to limit the amount of contact between the glass rod 12 and the retaining facilities 14, 16, 20, and 22 to lines of contact. These lines of contact may be further reduced by removing portions of the springs 16, 22 and protrusions 19b. For example, a modified retention spring 30, shown in FIG. 5, has slits 32 formed in the spring 30 at each protrusion 33 which contacts the integrating rod 12. These slits 32 reduce the contact area between the spring 30 and the integrating rod 12, thereby enhancing the performance of the display system.

Figure 7:
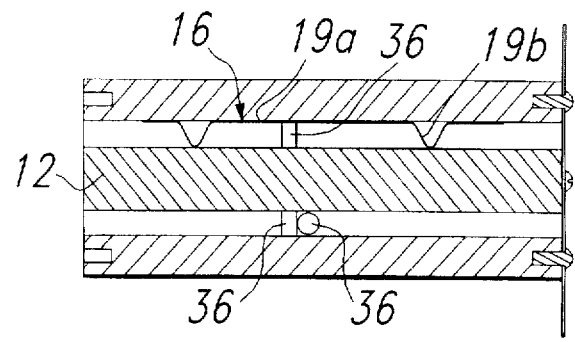
FIG. 7 is a cross-section view of the optic mount of FIG. 6 showing a support rod offset between the two contact points of a retention spring.
Figure 8:
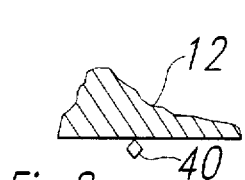
FIG. 8 is a partial cross-section view of an integrating optic supported by a rectangular support rod.
Figure 9:
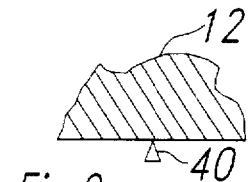
FIG. 9 is a partial cross-section view of an integrating optic supported by a triangular support rod.
Figure 10:
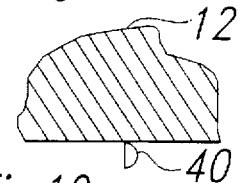
FIG. 10 is a partial cross-section view of an integrating optic supported by a semi-circular support rod.
Figure 11:
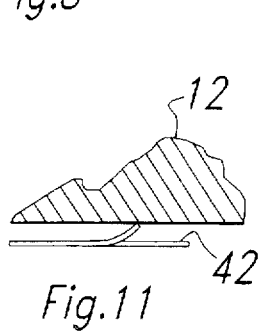
FIG. 11 is a partial cross-section view of an integrating optic biased by a retention spring having an alternative form.
Figure 12:
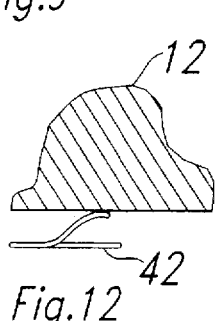
FIG. 12 is a partial cross-section view of an integrating optic biased by a retention spring having an alternative form.
Figure 13:
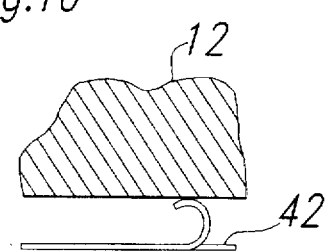
FIG. 13 is a partial cross-section view of an integrating optic biased by a retention spring having an alternative form.

The contact between the optic mount 16 and the integrating rod 12 may be further reduced by reducing the number of points of contact between the optic mount 10 and the integrating rod 12. Contact between the integrating rod 12 and the optic mount may be reduced by the use of a single support rod 36 in combination with the retention spring 16 as shown in FIGS. 6 and 7. As shown in FIG. 7, a single support rod 36 supports the integrating rod 12 at a point which is between the protrusions 19b of the retention spring 16 and is on the opposite side of the integrating rod 12 from the retention spring 16. The same reduction in contact surface may be achieved by using two support rods 36 in combination with an opposed retention spring 16 having a single point of contact with the integrating rod 12 which lies between the two support rods 36.

Offsetting the contact points of the support rod 36 and the opposed retention spring 16, however, may result in a moment applied to the glass integrating rod 12 which may generate enough stress on the glass integrating rod 12 to cause it to fracture when exposed to temperature extremes. Even if the stress on the glass integrating rod 12 is insufficient to fracture it, the stress will degrade the performance of the rod by reducing the modulation transfer function of the integrating rod 12. Therefore, although the embodiment of FIGS. 6 and 7 reduces degradation of internal light reflection caused by contact between the integrating rod 12 and the optic mount 10, the embodiment of FIG. 1 is preferred for use in high stress environments.

Although support rods 14, 20, and 36 have been shown as round rods, and springs 16 and 22 have been shown as having curved protrusions 19b, it should be understood that the purpose of the support rods and the springs is to minimize contact with the integrating rod 12 while providing support that is sufficient to restrain the integrating rod despite mechanical shock, while allowing for thermal expansion and contraction of the integrating rod. To this end, support rods and retaining springs of many shapes will fall within the scope hereof. For example, the support rods and the portion of the retention springs contacting the integrating rod 12 may be circular as shown in FIG. 1 through FIG. 7, or may assume one of the alternate shapes shown in FIG. 8 through FIG. 13. Each of the alternate support rods 40 and alternate springs 42 forms a knife-edge, or line, contact with the portion of the integrating rod 12.

Figure 14:
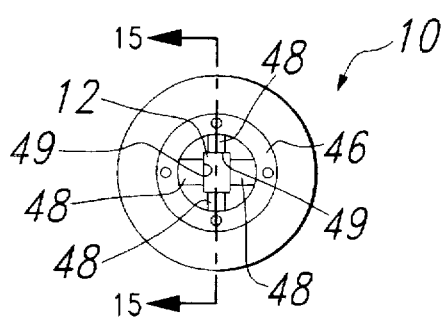
FIG. 14 is an end view of an optic mount with the output aperture removed, showing integral retention springs.
Figure 15:
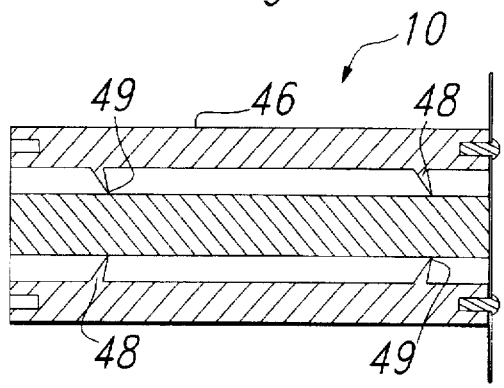
FIG. 15 is a cross-section view of the optic mount of FIG. 14.

FIG. 14 shows an end view and FIG. 15 shows a section view taken along line 15—15 in FIG. 14 of an optic mount 10 according to a further embodiment of the present invention. Eight spring members 48 are integrally formed with the inner wall of the enclosure 46 of FIG. 14 and FIG. 15 to form four pairs of opposing spring supports for the integrating rod 12. The distance between the ends 49 of opposed members 48 is less than the diametric size of the integrating rod 12. The integral springs 48 are sufficiently resilient to allow the integrating rod 12 to be pressed in from one end of the enclosure 46 and still firmly hold the integrating optic 12 in place. The foregoing may be achieved by forming the members 48 to point away from a first end of the enclosure 46 and to point toward the second enclosure end. The rod 12 is inserted into the enclosure from the first end. FIG. 15 is a cross section view of the embodiment of FIG. 14 showing two pairs of the opposing supports 48. Despite the differences in the physical shape of the integral springs 48 of FIG. 15 compared to the support rods 14, 20 and retention springs 16, 22 of FIG. 1, the integral springs 48 also function by contacting the integrating rod 12 along a single line contact directly opposed to the contact made by an opposing integral spring 48.

Figure 16:
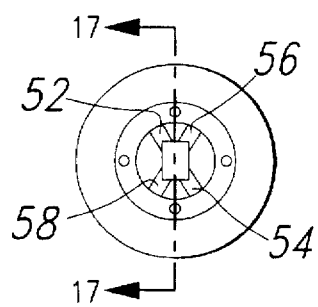
FIG. 16 is an end view of an optic mount with the output aperture removed, showing integral retention springs gripping the integrating optic by the corners of the integrating optic.
Figure 17:
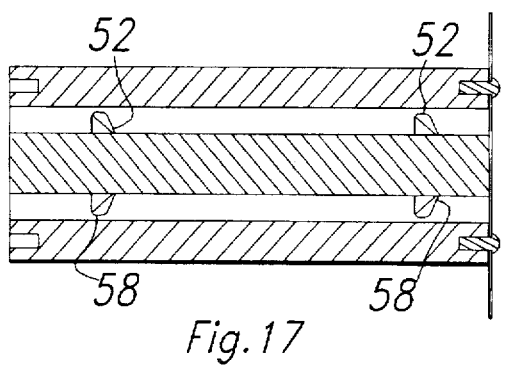
FIG. 17 is a cross-section view of the optic mount of FIG. 16.

FIG. 16 shows an end view and FIG. 17 shows a sectioned view taken along line 17—17 of FIG. 16 of an optic mount 10 having integral support members 52, 54, 56, and 58 similar to the springs 48 of FIG. 14 and FIG. 15. The integral support members 52, 54, 56, and 58 of FIGS. 16 and 17 grip the corners of the integrating rod 12. The integral support members 52, 54, 56, and 58 of FIGS. 16 and 17 are designed to maintain line contact with the integrating rod 12 in opposing pairs 52, 54 and 56, 58 therefore minimizing the stresses on the integrating rod 12 while simultaneously minimizing physical contact with the integrating rod 12. Because each support member 52, 54, 56, and 58 in FIGS. 16 and 17 grips the glass integrating optic 12 on two sides, each opposing pair 52, 54, and 56, 58 of support members 52, 54, 56, and 58 grips all four sides. Therefore applications with very small integrating rods, or very low dynamic environments, could securely hold the integrating optic using only one pair 52, 54 of support members on opposite corners of a first end of the integrating rod 12 and a second opposing pair 56, 58, at the second end of the integrating rod 12, typically centered on the other two corners of the integrating rod 12.

As mentioned above, holding the integrating rod 12 via opposing pairs of resilient members may lead to inaccuracies in the location of the rod. Therefore, the pairs of integral support members of FIG. 14 through FIG. 17 are preferably comprised of a rigid support member opposed by a resilient support member. For example, in FIGS. 16 and 17 support members 52 and 56 are resilient while support members 54 and 58 are rigid.

Thus, although there has been disclosed to this point a particular embodiment for a method of mounting an optical component and an apparatus therefor, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. Apparatus for mounting an elongated optical member so that the member is minimally contacted and is permitted to thermally expand and contract without damage thereto, the apparatus comprising:
    an elongated housing having a chamber therethrough for receiving the optical member therewithin and having a major axial dimension substantially equal to the length of the optical member;
    a first support rod mounted by the housing within the chamber for contacting and supporting the optical member along a first line which is generally perpendicular to the major axis of the chamber; and
    a first resilient member acting between the chamber and the optical member along a second line which is diametrically opposed to and parallel to the first line, the support rod and the resilient member permitting the optical member to expand and contract in a direction which is parallel to the major axis of the chamber, the resilient member permitting the optical member to expand and contract perpendicularly to the major axis of the chamber.

2. Apparatus as in claim 1, which further comprises:
    a second support rod mounted by the housing within the chamber for contacting and supporting the optical member along a third line which is generally perpendicular to the major axis of the chamber and to the first line; and
    a second resilient member acting between the chamber and the optical member along a fourth line which is diametrically opposed to and parallel to the third line, the second support rod and resilient member functioning as do the first support rod and first resilient member.

3. Apparatus as in claim 1, which further comprises:
    a second support rod mounted by the housing within the chamber for contacting and supporting the optical member along a third line which is generally perpendicular to the major axis and coplanar with the first line; and
    a second resilient member acting between the chamber and the optical member along a fourth line which is diametrically opposed to and parallel to the third line, the second support rod and resilient member being spaced apart from the first support rod and resilient member along the major axis of the chamber.

4. Apparatus as in claim 3, wherein:
    the first and second resilient members are protrusions formed in an elongated, resilient strip, the majority of the strip engaging the wall of the chamber and the protrusions engaging the optical member along the second and fourth lines.

5. Apparatus as in claim 1, wherein:
    the chamber includes aligned holes extending along the first line through the wall thereof into which holes the support rod is inserted.

6. Apparatus as in claim 1, wherein:
    the resilient member is a strip having a protrusion formed therein, the strip resting against the wall of the chamber and the protrusion engaging the optical member along the second line.

7. Apparatus as in claim 1, which further comprises:
    a reflective input aperture plate mounted to one end of the housing.

8. Apparatus as in claim 7, wherein:
    said reflective input aperture plate is mounted so as to reflect stray light away from said optical member, thereby reducing optical mount temperatures.

9. Apparatus as in claim 7, which further comprises:
    an output aperture plate mounted to an end of the housing opposite said input aperture plate.

10. Apparatus as in claim 9, wherein:
    said output aperture plate is formed with an aperture which frames light to a size and shape corresponding to a spatial light modulator array.

11. Apparatus as in claim 7, wherein:
    said reflective input aperture plate is mounted at an angle to said optical member.

12. Apparatus as in claim 7, wherein: said reflective input aperture plate has curvature, thereby increasing light levels at output of said optical member.

13. Apparatus for mounting an elongated optical member so that the member is minimally contacted and is permitted to thermally expand and contract without damage thereto, the apparatus comprising:
    an elongated housing having a chamber therethrough for receiving the optical member therewithin and having a major axial dimension substantially equal to the length of the optical member;
    a first support member mounted by the housing and within the chamber for contacting and supporting the optical member through a first region which is generally perpendicular to the major axis of the chamber; and
    a first resilient member acting between the chamber and the optical member through a second region which is diametrically opposed to the first region, the support member and the resilient member permitting the optical member to expand and contract in a direction which is parallel to the major axis of the chamber, the resilient member permitting the optical member to expand and contract perpendicularly to the major axis of the chamber.

14. Apparatus as in claim 13, which further comprises:
    a second support member mounted by the housing and within the chamber for contacting and supporting the optical member through a third region; and
    second resilient member acting between the chamber and the optical member through a fourth region, the second support member and second resilient member functioning as do the first support member and the first resilient member.

15. Apparatus as in claim 13, which further comprises:

a second support member mounted by the housing and within the chamber for contacting and supporting the optical member through a third region; and a second resilient member acting between the chamber and the optical member through a fourth region, the second support member and second resilient member being spaced apart from the first support member and first resilient member along the major axis of the chamber.

16. Apparatus as in claim 13, wherein:

the first region is a line perpendicular to the major axis of the optical member.

17. Apparatus as in claim 13 wherein:

the second region is a line perpendicular to the major axis of the optical member.

18. Apparatus as in claim 13, wherein:

the first region is a line perpendicular to the major axis of the optical member, and the second region is a line perpendicular to the major axis of the optical member and perpendicular to the first region.

19. Apparatus as in claim 13, wherein:

the first support member is formed integral with the housing.

20. Apparatus as in claim 13, wherein:

the first resilient member is formed integral with the housing.

21. Apparatus as in claim 13 wherein:

the second support member is formed integral with the housing.

22. Apparatus as in claim 13, wherein:

the second resilient member is formed integral with the housing.

23. Apparatus as in claim 13, wherein:

the first region is two lines perpendicular to the major axis of the optical member and perpendicular to each other, and the second region is two lines perpendicular to the major axis of the optical member and parallel to the two lines forming the first region.

24. A method of retaining an elongated optical component, said method comprising:

providing a first member for supporting said elongated optical component; elastically biasing said elongated optical component against said first member;

providing a second member to restrain movement of said optical component across said first member;

elastically biasing said elongated optical component against said second member.

* * * * *